(12) United States Patent
Brünig et al.

(10) Patent No.: US 6,987,969 B1
(45) Date of Patent: Jan. 17, 2006

(54) METHOD FOR ROUTING MESSAGES IN A TELECOMMUNICATIONS NETWORK

(75) Inventors: Roger Brünig, Düsseldorf (DE); Katharina Dierkes, Essen (DE); Armin Hüwels, Essen (DE); Christian Müller, Wülfrath (DE); Michael Reich, Düsseldorf (DE); Ulrich Sundermann, Illnau (CH)

(73) Assignee: E-Plus Mobilfunk GmbH, Düsseldorf (DE)

( * ) Notice: Subject to any disclaimer, the term of this patent is extended or adjusted under 35 U.S.C. 154(b) by 0 days.

(21) Appl. No.: 09/868,746

(22) PCT Filed: Oct. 18, 1999

(86) PCT No.: PCT/EP99/07884

§ 371 (c)(1),
(2), (4) Date: Jan. 14, 2002

(87) PCT Pub. No.: WO00/38458

PCT Pub. Date: Jun. 29, 2000

(30) Foreign Application Priority Data

Dec. 21, 1998 (DE) ................................ 198 59 081

(51) Int. Cl.
*H04Q 7/20* (2006.01)

(52) U.S. Cl. .................... 455/433; 455/412.1; 455/413

(58) Field of Classification Search ................ 455/466, 455/435.1, 435.2, 433, 432.1–432.3, 445, 455/412.1, 412.2, 413
See application file for complete search history.

(56) References Cited

U.S. PATENT DOCUMENTS

| | | | | |
|---|---|---|---|---|
| 5,627,877 A | * | 5/1997 | Penttonen | 455/413 |
| 5,839,064 A | * | 11/1998 | Foti | 455/413 |
| 5,881,235 A | * | 3/1999 | Mills | 709/221 |
| 5,943,619 A | * | 8/1999 | Coyne et al. | 455/433 |
| 6,122,510 A | * | 9/2000 | Granberg | 455/433 |
| 6,282,416 B1 | * | 8/2001 | Verdonk | 455/413 |
| 6,298,232 B1 | * | 10/2001 | Marin et al. | 455/413 |
| 6,370,390 B1 | * | 4/2002 | Salin et al. | 455/466 |
| 6,665,532 B1 | * | 12/2003 | Boland et al. | 455/413 |
| 6,810,257 B1 | * | 10/2004 | Amin | 455/445 |

FOREIGN PATENT DOCUMENTS

| | | |
|---|---|---|
| DE | 195 15 558 C1 | 9/1996 |
| WO | WO 98/28920 | 7/1998 |
| WO | WO 98/44640 | 10/1998 |

OTHER PUBLICATIONS

Andrew S. Tanenbaum, Computernetzwerke, 3, pp. 28-30.
B. Walke, Mobilfunknetze und ihre Protokolle Band 1, pp. 295-311.

* cited by examiner

*Primary Examiner*—Charles N. Appiah
(74) *Attorney, Agent, or Firm*—Brinks Hofer Gilson & Lione (57) ABSTRACT

A Network Address Register (NAR) is a routing device for use in a GSM telephone system. The NAR receives network messages and determines the network address of the appropriate network elements (network items) that is the destination of the message. The NAR allows subscribers and network elements of the GSM telephone system to be assigned independently. Existing methods of assigning subscribers and network elements using fixed association, such as telephone number blocks, are eliminated.

12 Claims, 9 Drawing Sheets

Inquiry
650

Figure 6

Inquiry
750

METHOD FOR ROUTING MESSAGES IN A TELECOMMUNICATIONS NETWORK

REFERENCE TO RELATED APPLICATION

This application claims the benefit of PCT patent application WO 00/38458, filed on Jun. 29, 2000, titled "Method For Routing Messages In At Least One Telecommunications Network According To The GSM Standard."

BACKGROUND

This invention relates generally to the field of mobile communication and more specifically to mobile communication system that uses a NAR.

In conventional cellular GSM mobile telephony networks, subscriber data for a mobile telephone subscriber is maintained in a central data base, called the Home Location Register ("HLR"). As the number of subscribers and thus the need for calling numbers increases, the planning required for organizing the HLR, Subscriber Identity Module ("SIM") card, and Voice Mail Service Center ("VMSC") become considerably more complex. The added complexity is due in part to the need to form blocks of calling numbers and distribute them to the HLRs and VMSCs. The system planning is made more difficult due to special-request call numbers. Further complexity is added by the formation of blocks for Mobile Station ISDN Number ("MSISDN") and the International Mobile Subscriber Identity ("IMSI"). Due to the system limitations of the HLR, mobile telephony networks with many subscribers typically have multiple HLRs. The determination of which HLR stores data for which subscriber is determined as a function of the calling numbers of the mobile telephone subscriber or the subscriber's IMSI. The determination of which subscriber data is on which HLR is part of the network design. Other network elements also contain subscriber-specific data including the Service Control Points ("SCP") with integrated Service Data Function ("SDF") and the Voice Mail Centers ("VMSC") that provide centralized answering services.

Since GSM subscriber data is stored in the HLRs and each subscriber is identified by an MSISDN or an IMSI, the Mobile Services Switching Centers ("MSC") and the Visitor Location Register ("VLR") must be able to determine the subscriber's HLR based solely on an MSISDN or an IMSI. Due to capacity and administrative limits, all individual calling numbers and IMSIs cannot be stored in the MSCs routing tables. The MSISDN is used for Mobile Terminating Calls ("MTC") and the IMSI is used for location updates. The call routing is defined by the MSC. Since an individual IMSI of an international subscriber is programmed in the SIM cards, the combination of SIM card and calling number must match when the subscriber is activated and they must be assigned to the same HLR. If this is not the case, a virtual subscriber entry is created in the HLR, which may have limited capacity available. Subscriber distribution to HLRs becomes increasingly more difficult as the number of subscribers and/or HLRs increases. The capacity of the HLRs will be further drained as additional network identification numbers are added.

Some customers request a specific calling number (telephone number"). Allocating calling numbers to specific customers complicates the configuration of the MSCs and distribution of the calling numbers to the existing HLR. When the calling number space available for activation is already set up, allocating a specific calling number to a customer is even more difficult.

HLR splits commonly occur when a new HLR is put into service. Calling number and IMSI ranges are assigned to the new HLR so that subscribers can be activated in this new HLR. Such assignments are characterized during HLR roll-out similarly to calling number allocation and numbering planning by the Voice Mail Service Center ("VMSC"). Thus, adding a new HLR requires an immense amount of planning and is highly susceptibility for errors. HLR capacity is often wasted as a result.

Similar considerations as those posed in conjunction with adding an HLR can also result for other network elements having subscriber-specific data. For example, the subscriber data for Intelligent Network ("IN") services of a subscriber are stored in the Service Control Point ("SCP").

The global system for mobile communications ("GSM") standard is well known. The GSM standard § 03.02 (ETS 300.522) concerns European digital telecommunications system (Phase 2). The European Telecommunications Standard of Institutes ("ETSI") defines a network architecture for GSM network, including digital cellular telecommunications system. The GSM standard section § 03.04 (ETS 300.524) concerns the signaling requirement relating to routing of calls to mobile subscribers in the European digital cellular telecommunications system (Phase 2). The GSM standard 09.02 (ETS 300.599) further describes the European digital cellular telecommunications system (phase 2). The Mobile Application Part ("MAP") specification describes the ETSI returns. The GSM standard § 03.12 (ETS 300,530) describes location registration procedures on the ETSI returns in the European digital cellular telecommunications system (phase 2).

SUMMARY

A Network Address Register ("NAR"), a routing device, assigns mobile network subscribers individually to the network elements. The NAR may be used in a mobile telephone network, for example a cellular telephone network, to eliminate the requirement of formation of blocks of telephone numbers (calling numbers). The need to distribute the calling numbers to the various network, such as the HLRs, is also eliminated. The improved system also eliminates the need for virtual HLR entries and the errors associated with virtual HLR entries. Eliminating these needs provides better capacity utilization of existing network elements.

Due to the better capacity utilization, A network with the NAR may eliminate the need for some network elements. Thus reducing cost and complexity. Additional savings may be realized in the areas of calling numbering planning, calling number administration, and SIM card distribution. The NAR may be used with existing services, network elements, and functions provided in conventional telecommunications networks. The NAR may also be used with other applications including applications implementing the Mobile Number Portability ("MNP") standard. The NAR software may also be adaptable to various application-specific requirements.

The NAR may route messages to the appropriate network elements, for example MAP Send-Routing-Information to the HLR. Alternatively, the NAR may determine a network element address and return the routing information to the inquiring system. For example, the routing information may include INAP: initial DP+Connect. The inquiring system can then relay the message.

The foregoing discussion has been provided only by way of introduction. Nothing in this section should be taken as a limitation on the following claims, which define the scope of the invention.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION

A. Definitions
ABC—Administration and Billing Center
AuC—Authentication Center
ADC—Administration system
BSS—Base Station Subsystem
Calling number—The telephone number of the call originator.
Called number—The called telephone number.
CAP—CAMEL Application Part
CCBS—Call Completion to Busy Subscriber
CSC—Customer Service Center
DPC—Destination Point Code
DTAG—Deutsche Telekom AG
EIR—Equipment Identity Register
ETSI—European Telecommunications Standards Institute
GSMC—Gateway Mobile Services Switching Center
GPRS—General Packet Radio Service
GSM—Global System for Mobile Communications
HLR—Home Location Register
HPLMN—Home Public Land Mobile Network
IDP—Initial Detection Point
IMEI—International Mobile Equipment Identity
IMSI—International Mobile Subscriber Identity
IN—Intelligent Network
INAP—Intelligent Network Application Part
ISDN—Integrated Services Digital Network
LNP—Local Number Portability
LUP—Location Update Procedure
MAP—Mobile Application Part
MAPv1—MAP version 1
MAPv2—MAP version 2
MD—Mediation Device
MNP—Mobile Number Portability
MOC—Mobile Originated Call
MSC—Mobile Services Switching Center
MSISDN—Mobile Station ISDN Number
MTC—Mobile Terminating Calls
MTP—Message Transfer Part
NAR—Network Address Register
NMC—Network Management Center
OMC—Operation and Maintenance Center
OPC—Originating Point Code
PSTN—Public Switched Telephone Network
SCCP—Signaling Connection Control Part
SCP—Service Control Point
SDF—Service Data Function
SIM—Subscriber Identity Module
SIM card—a SIM card is used for billing, security and number storage. The SIM card parameters are defined by ISO GSM SIM Card standards.
SMS—Short Message Service
SMSC—Short Message Service Center
SSP—Service Switching Point
SPC—Signaling Point Code
SRI—Send Routing information
STP—Signaling Transfer Point
TC—Transaction Capabilities
UMTS—Universal Mobile Telecommunications System
VASS—Value Added Services System
VLR—Visitor Location Register
VMSC—Voice Mail Service Center B. Introduction The following description of the preferred embodiments of the invention is not intended to limit the scope of the invention to these preferred embodiments, but rather to enable any person skilled in the art to make and use the invention.

The NAR is an active effective network element that allocates which physical network element contains the subscriber-specific data. For example, the NAR may determine that the subscriber data records for a first subscriber by located on a first HLR and the subscriber data records for a second subscriber by located on a second HLR. The NAR, therefore, should be a highly reliability. If an NAR becomes unavailable, for example due to a failure of all network elements in a conventional GSM network. Also, if a NAR becomes unavailable, some value-added services and mobility management may be seriously impaired. For these reasons, the network architecture must provide a high degree of security. Therefore redundant NAR in the network configuration may be used.

The HLR planning may be isolated from call-number allocation and SIM card requests. The generation of the system characteristics may be isolated from MSISDN/IMSI distribution. The quality of the network is improved by eliminating virtual subscriber entries.

The various applications of the method based on the invention have been depicted in the drawing and described using common international terminology. This is not intended to imply that all of the individual applications must be implemented simultaneously in one telecommunications network, such as a fixed telephony network.

The design benefits of a telephone system having a NAR includes: 1. allocation of IMSI/MSISDN ranges to HLR is eliminated; 2. HLR planning is separated from call-number allocations and SIM card production; 3. representation of system characteristics in the MSC is separated from MSISDN/IMSI distribution; and 3. network quality is improved due to the elimination of virtual subscribers, which are often results in errors.

C. NAR-Based Network

FIGS. 1–14 illustrate schematic diagrams of various embodiments of NAR-based networks and message flows. The various systems and methods presented in FIGS. 1 through 14 can be used individually, in a single telecommunication network, or in multiple mobile telecommunication networks, e.g. in two interconnected mobile telephony networks, and/or in one or more mobile telephony networks in conjunction with one or more fixed networks.

Figure 1:
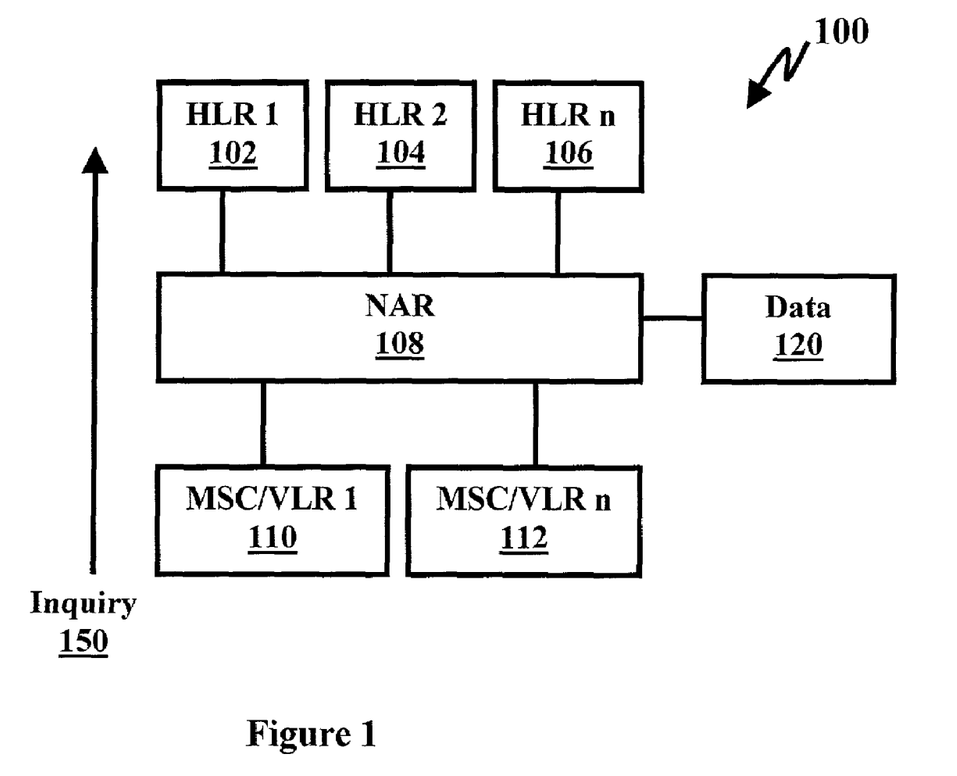
FIG. 1 illustrates an embodiment of a telephone system with a NAR that routes messages to HLRs.

Referring to FIG. 1, an embodiment of a telephone system 100 with a NAR 108 that routes messages 150 from MSC/VLRs 110 and 112 to HLRs 102, 104, and 106 is illustrated. An inquiry message 150 from a first MSC 110 or a first VLR 110 is received by the NAR 108. The inquiry message 150 may include the IMSI and the MSISDN. The NAR 108 determines the HLR, for example HLR1 102 that corresponds with the IMSI and the MSISDN in the inquiry message 150. The NAR 108 may use a database, a buffer, or other method to store the Data 120 that is used to determined the HLR that corresponds to the IMSI and the MSISDN. The Data 120 may include a routing database.

Figure 2:
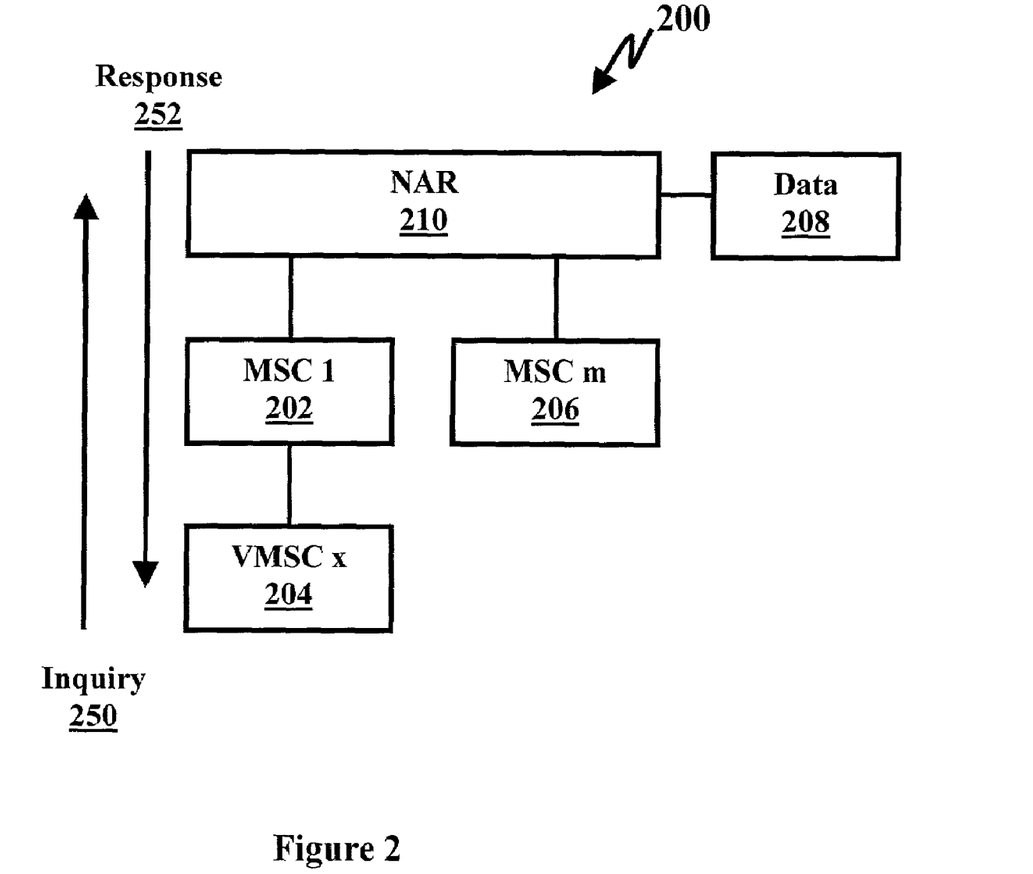
FIG. 2 illustrates an embodiment of a telephone system with a NAR that routes messages to VMSCs via MSCs via a NAR.

Referring to FIG. 2, an embodiment of a telephone system 200 with a NAR 210 that routes messages from a VMSC 204 via a MSC 202 and a NAR 210 is illustrated. The NAR 210 determines the appropriate VMSC based on the MSISDN of the inquiring mobile station. The relationships between MSISDNs and VMSCs may be stored in a database, a buffer, or other storage device represented by Data 208. The selection criterion for the MSISDN may include a mobile originating call ("MOC") in the VMSC inquiry and the forwarded call. A NAR 210 may communicate with numerous VMSCs via one or more MSCs 202 and 206.

Figure 3:
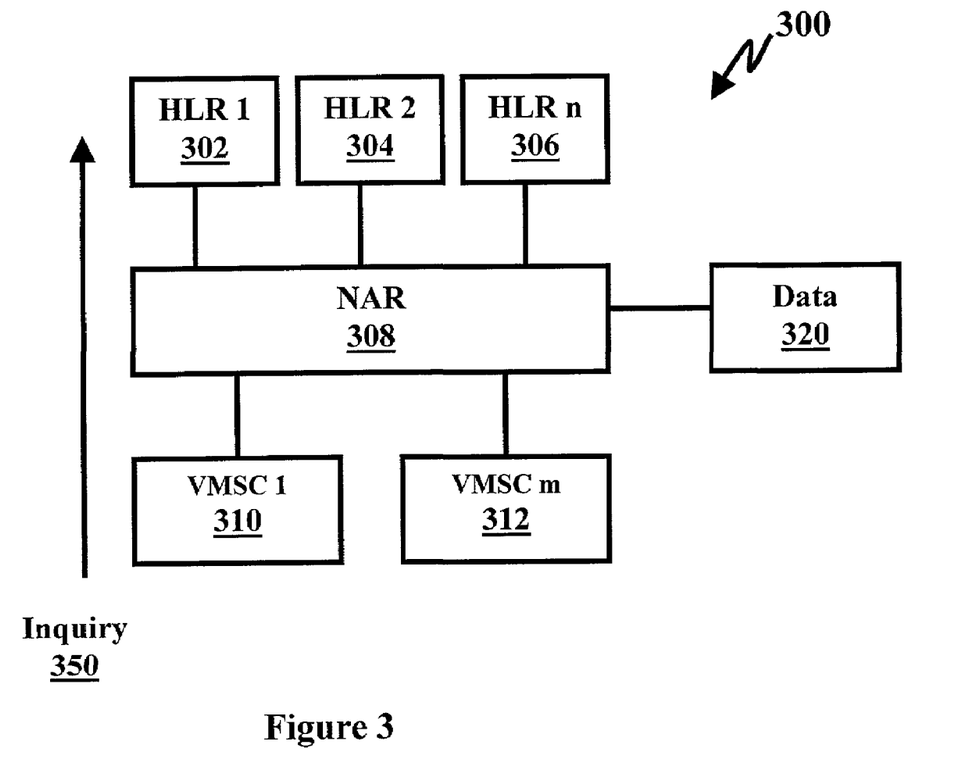
FIG. 3 illustrates an embodiment of a telephone system with a NAR that routes messages to HLRs from VMSCs via a NAR.

Referring to FIG. 3, an embodiment of a telephone system 300 with a NAR 308 that routes messages 350 to HLRs 302, 304, and 306 from VMSCs 310 and 312 via a NAR 308 is illustrated. The NAR 308 determines the appropriate HLR based on the MSISDN. The relationships between MSISDNs and HLRs may be stored in a database, a buffer, or other storage device represented by Data 320. The selection criterion for the MSISDN may include supplementary service handling.

Figure 4:
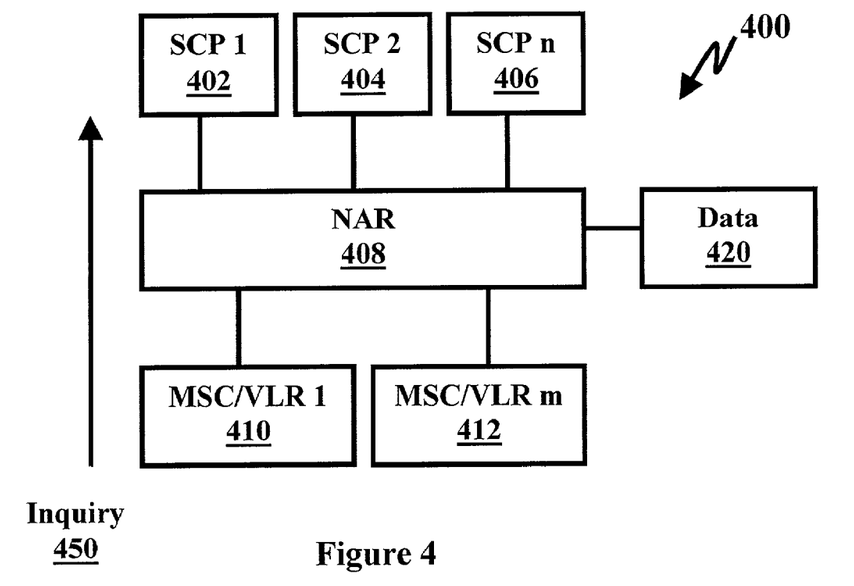
FIG. 4 illustrates an embodiment of a telephone system with a NAR that routes messages to HLRs from MSCs via a NAR.

Referring to FIG. 4, an embodiment of a telephone system 400 with a NAR 408 that routes messages to SCPs 402, 404, and 406 from MSCs or VLRs 410 and 412 is illustrated. The NAR 408 determines the appropriate SCP based on the IMSI, MSISDN, and/or IMEI in the message. The relationships between IMSIs, MSISDNs, IMEIs, and SCPs may be stored in a database, a buffer, or other storage device represented by Data 420. The selection criterion for the IMSI may include location update ("inscription") and authentication. The selection criterion for the MSISDN my include mobile terminating call ("MTC"), mobile originating call ("MOC"), and supplementary service handling. The selection criterion for the IMEI my include IMEI check and fraud control.

Figure 5:
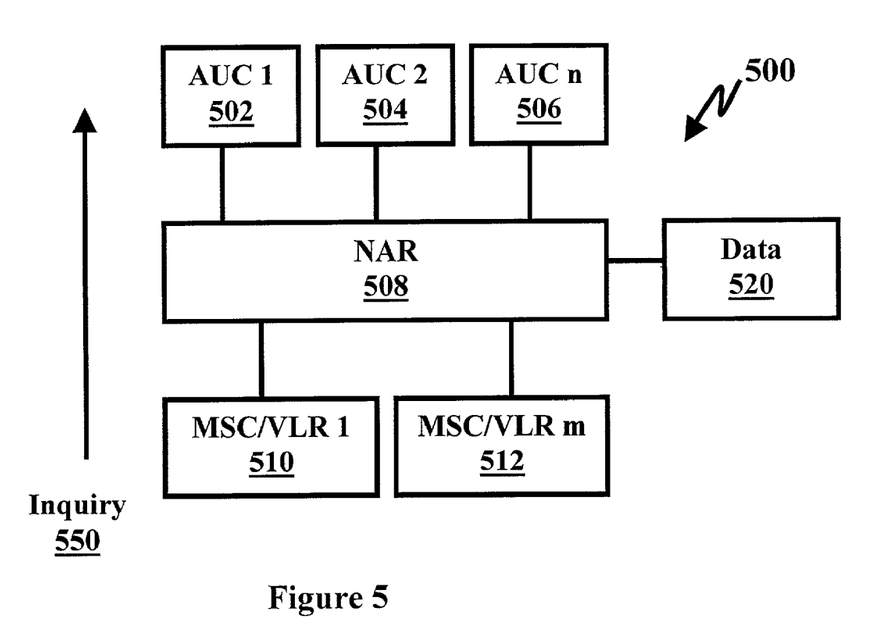
FIG. 5 illustrates an embodiment of a telephone system with a NAR that routes messages to AUC from MSCs/VLRs via a NAR.

Referring to FIG. 5, an embodiment of a telephone system 500 with a NAR 508 that routes messages 550 to AUC 502, 504, and 506 from MSCs/VLRs 510 and 512 is illustrated. The NAR 508 may determine the appropriate AUC based on the IMSI in the message. The relationships between IMSIs and AUCs may be stored in a database, a buffer, or other storage device represented by Data 520. The selection criterion for the IMSI may include authentication.

Figure 6:
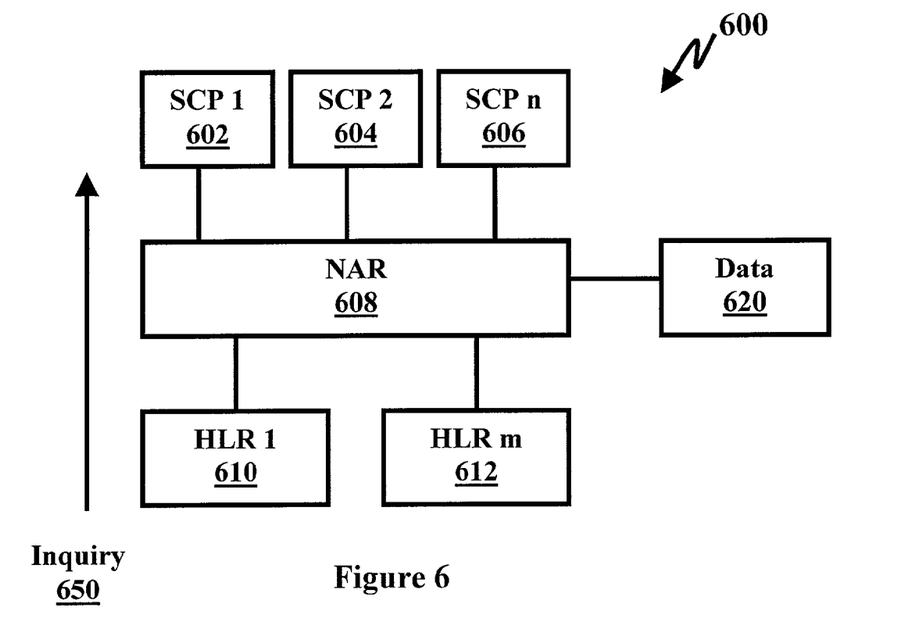
FIG. 6 illustrates an embodiment of a telephone system with a NAR that routes messages to SCP from HLRs via a NAR.

Referring to FIG. 6, an embodiment of a telephone system 600 with a NAR 608 that routes messages to SCPs 602, 604, and 606 from HLRs 610 and 612 is illustrated. The NAR 608 may determine the appropriate SCP based on the IMSI and the MSISDN in the message. The relationships between IMSIs, MSISDNs, and the AUCs may be stored in a database, a buffer, or other storage device represented by Data 620. The selection criterion for the MSISDN may include supplementary service handling. The selection criterion for the Selection criterion for the IMSI includes Location Update.

Referring to FIG. 6, the message flow from the MSC/VLR to an EIR via a NAR is illustrated. The selection criterion for the IMEI includes IMEI Check and Fraud Control.

Figure 7:
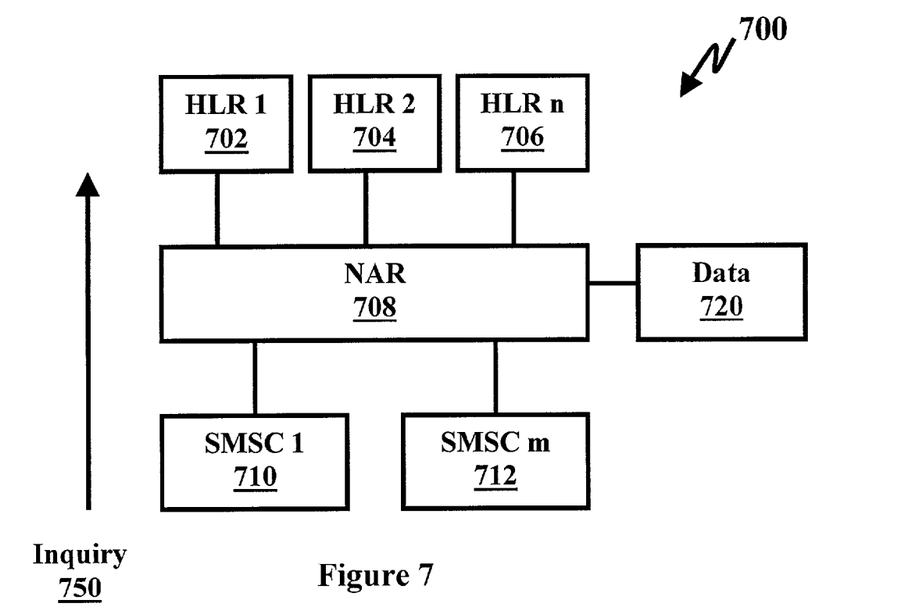
FIG. 7 illustrates a method of routing messages to HLRs from SMSCs via a NAR.

Referring to FIG. 7, an embodiment of a telephone system 700 with a NAR 708 that routes messages 750 from SMSCs 710 and 712 to HLRs 702, 704, and 706 is illustrated. The NAR 708 may determine the appropriate HLR based on the MSISDN in the message. The relationships between MSISDNs and AUCs may be stored in a database, a buffer, or other storage device represented by Data 720. The selection criterion for the MSISDN may include supplementary service handling.

Figure 8:
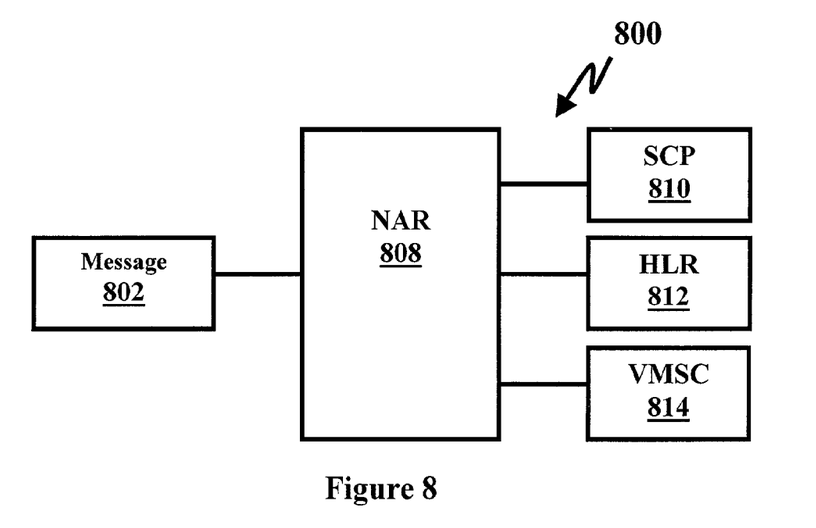
FIG. 8 illustrates a system with a NAR as central message distributors.

Referring to FIG. 8, a system 800 with a NAR 808 as central message distributors is illustrated. The message 802 is routed by the NAR 808 to the appropriate SCP 810, HLR 812, or VMSC 814. The NAR 808 may include a centralize message buffer.

Figure 9:
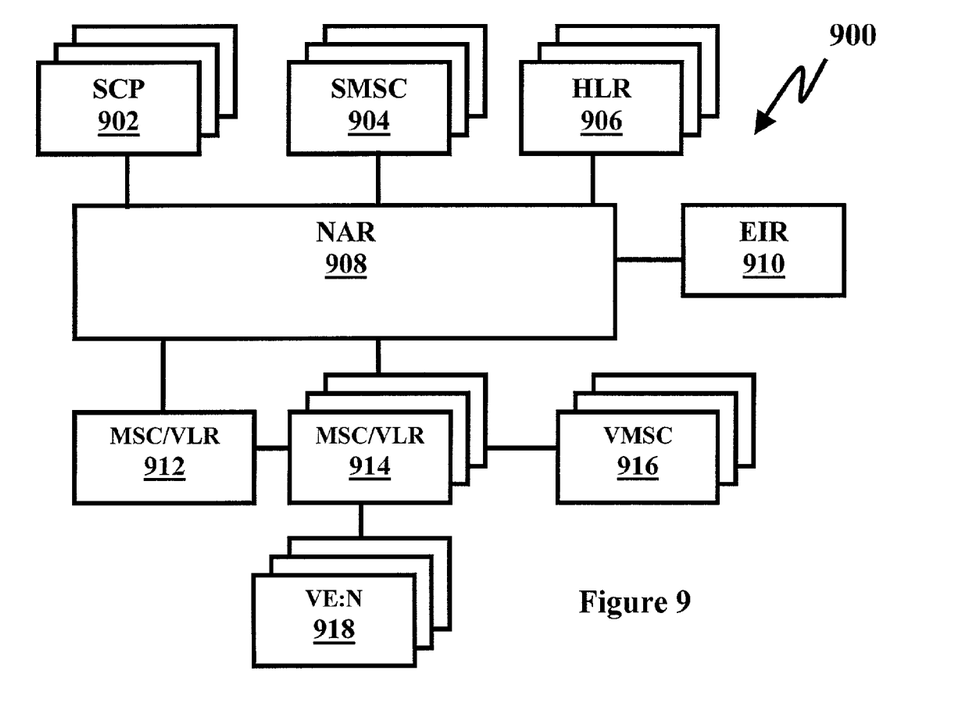
FIG. 9 illustrates a system with a NAR in the telephone network.

Referring to FIG. 9, a telephone network (mobile signaling network) 900 with a NAR 908 is illustrated. The telephone network 900 may include a GSM telecommunication network. The NAR 908 is used in the signaling portion of the telephone network 900 and not the switched portion. Thus, no traffic channels are carried by the NAR. a method of using Mobile Number Portability ("MNP") is illustrated. The telephone network 900 with a NAR 908 has greater flexibility than conventional networks in all elements that refer to subscriber-specific data, such as SCP 902, SMSC 904, HLRs 906, EIR 910, MSCs/VLRs 912 and 914, VMSC 916, and VE:ns 918.

Figure 10:
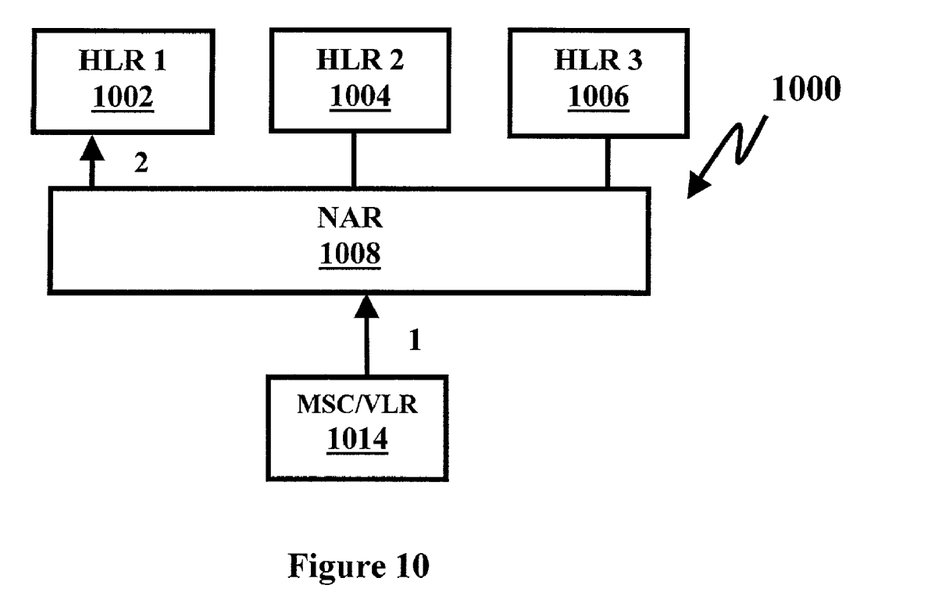
FIG. 10 illustrates a system with a NAR in the telephone network.

Referring to FIG. 10, illustrates a transit function of the NAR 1008 in the telephone network 1000. The NAR 1008 routes a messages from the MSC/VLR 1014 to the HLR 1102. The NAR 1008 may provide local number portability ("LNP"). The NAR 1008 may route the message based in part on the MSISDN. The selection criterion for the MSISDN may include the PSTN Terminating Call ("PTC").

Figure 11:
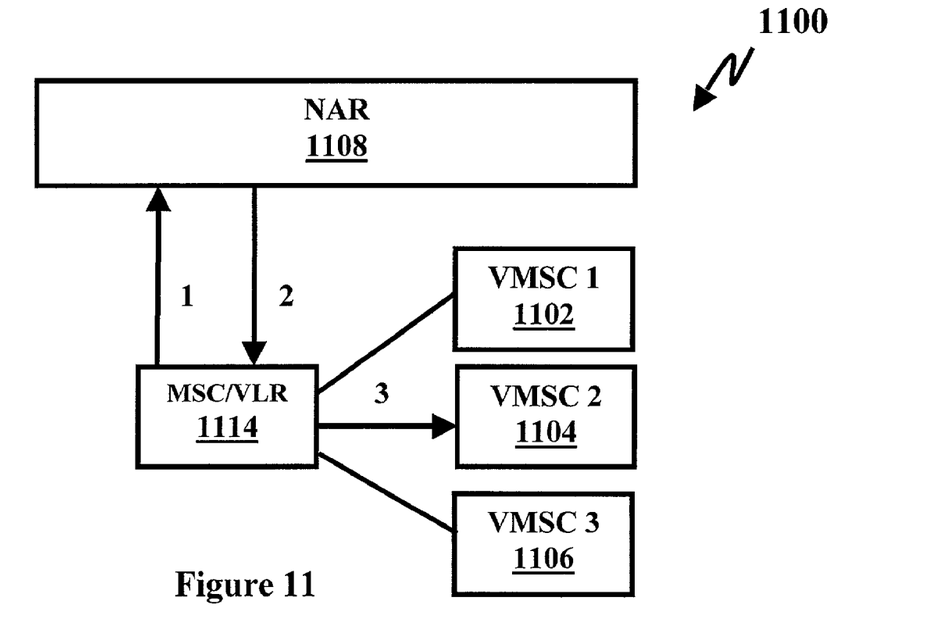
FIG. 11 illustrates a transit and final function of NAR.

Referring to FIG. 11, illustrates a transit function of the NAR 1108 in the telephone network 1100. The NAR 1108 routes a messages from the MSC/VLR 1014 to the VMSC 1104.

Figure 12:
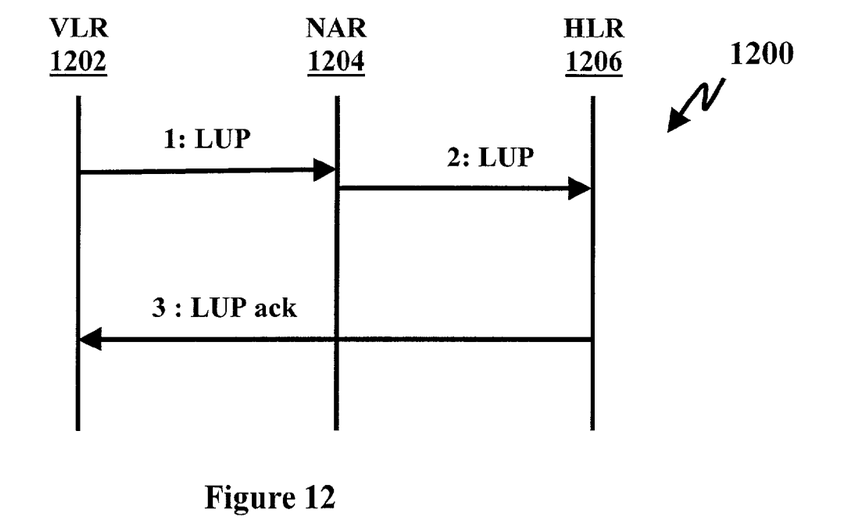
FIG. 12 illustrates a information flow VLR, NAR and HLR.

Referring to FIG. 12, a "location update" flow from a VLR 1202 to a HLR 1206 is via a NAR 1204 is illustrated. The VLR 1202 send a message "1:LUP" to the NAR 1204.

The NAR 1204 routes the message "2:LUP" to the appropriate HLR 1206. The HLR 1206 then sends an acknowledgement message "3:LUP ack" to the originating VLR 1202.

Figure 13:
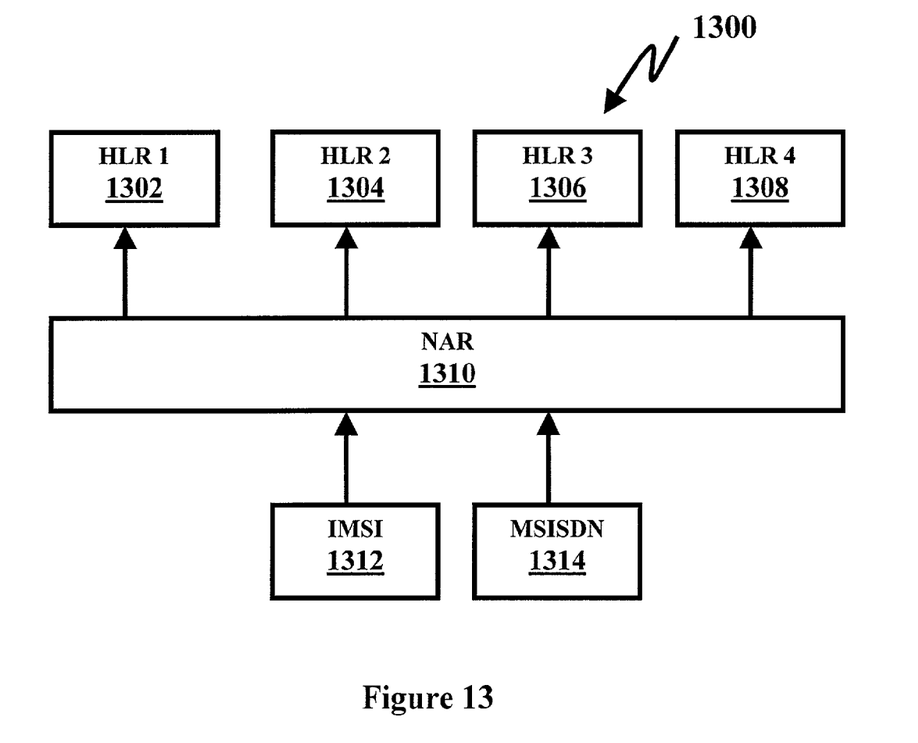
FIG. 13 illustrates a NAR as HLR-Router (in the GSM-Network).

Referring to FIG. 13, a NAR 1310 is used as a HLR-Router in a GSM based network 1300. A NAR-based network 1300 implements a different routing principle in a telecommunications network, e.g. a mobile telephony network, than conventional networks. In a NAR-based network 1300 subscriber-specific allocation of MSISDNs 1314 and IMSIs 1312 to the HLRs 1302, 1304, 1306, and 1308 are defined. The NAR 1308 may include a database with the allocations that are used when inquiries are sent to the HLR 1302, 1304, 1306, and 1308. The routing criteria may be the MSISDN and the IMSI.

Figure 14:
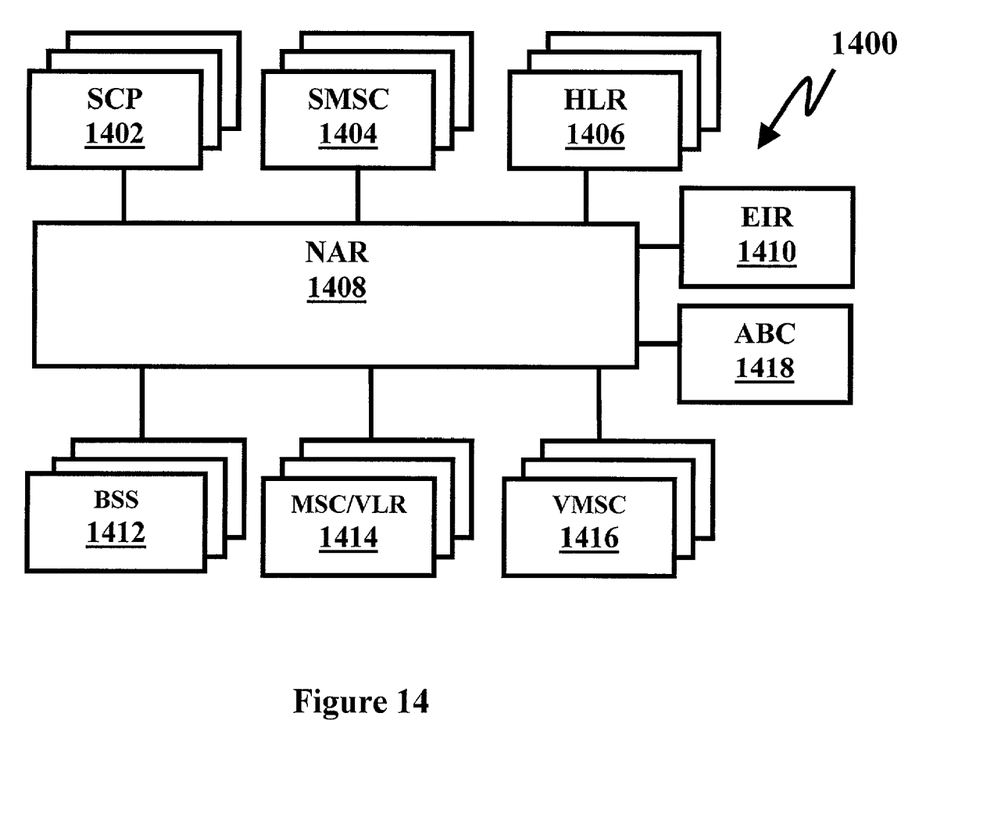
FIG. 14 illustrates a telecommunication system with a NAR as a router.

Referring to FIG. 14, a telecommunication system 1400 with a NAR 1408 as a router is illustrated. The NAR 1408 may be integrated into a conventional GSM network that includes network elements, such as SCPs 1402, SMSCs 1404, HLRs 1406, BSSs 1412, MSC/VLRs 1414, VMSCs 1416, an EIR 1410, and an ABC 1418. The GSM network may be an intelligent network ("IN"). Also, value-added services network elements, such as short-message service and automatic answering, may be included in the system.

D. Network Elements Addressing

The addressing in the individual network elements may be carried out as follows:

I. Subscriber's IMSI-Based Addressing:

1: VLR:
MTP: The DPC is the SPC of the NAR, the OPC is the SPC of the VLR.
SCCP: The called party number is the "IMSI" (E.214; E.212) and the calling party number is the VLR address (E.164)

The Global Title Analysis is set up in the VLR in such a way that the SPC of the NAR is used as the DPC.

2. NAR:
MTP: The DPC is the SPC of the HLR, the OPC is the SPC of the NAR.
SCCP: The called party number is the "IMSI" (E.214; and possibly E.212) and the calling party number is the VLR address (E.164)

A Global Title Translation is carried out in the NAR, the result of which is the SPC of the HLR, which is used as the new DPC.

3. HLR: MTP: DPC=SPC of the VLR, OPC=SPC of the HLR
SCCP: The called party number is the VLR address (E.164) and the calling party number is the HLR address (E.164).

These addressing mechanisms are comparable to existing mechanisms in GSM mobile telephony networks.

Addressing based on the MSISDN of the subscriber:

1. VLR:
MTP: The DPC is the SPC of the NAR, the OPC is the SPC of the VLR. SCCP: The called party number is the MSISDN (E.164). The calling party number is the VLR address (E.164).

The Global Title Analysis is set up in the VLR in such a way that the SPC of the NAR is always used as the DPC.

2. NAR:
MTP: The DPC is the SPC of the HLR, the OPC is the SPC of the NAR. SCCP: The called party number is the MSISDN (E.164). The calling party number is the VLR address (E.164).

A Global Title Translation may be carried out in the NAR that results in the SPC of the HLR to be used as the new DPC.

3. HLR:
MTP: The DPC is the SPC of the VLR, the OPC is the SPC of the HLR. SCCP: The called party number is the VLR address (E.164) and the calling party number is the HLR address (E.164).

As an alternative, the messages may be decoded in the NAR up to the application layer. The routing may then be based on the information obtained there, for example the IMSI and the MSISDN.

E. Routing

Selection criterion for the MSISDN includes the Mobile Terminating Call ("MTC") and the Supplementary Service Handling. The selection criterion for the IMSI includes the Location Update (inscription).

The NAR is an active network element with an interface to the administration system ("ADC"). The NAR may be integrated directly as a network element in the call set-up phase for Mobile Terminating Calls ("MTC"). When the NAR is used for call set-up, performance of the NAR is important to add as little overhead in the set-up process. The NAR can be used in the signaling network as a duplicated central network element.

F. Mobility Management

During initiation of the telecommunications network, e.g. a mobile telephony network, when a location ("VLR range") may be changed or a mobile telephone may be reactivated, the new location is reported to the HLR and corresponding data is updated as needed. The subscriber may be identified using the IMSI. In the response message, the HLR sends its network address to the VLR. From this point forward, the VLR knows the subscriber's HLR address. All further messages are sent from the VLR to the HLR are based on the subscriber's HLR address. (MAP: update location; IMSI; VLR→HLR).

G. Call Control

When a call is placed to a mobile subscriber ("MTC"), the gateway MSC queries the HLR regarding the current location of the called party. The query is carried out based on the subscriber call number ("MSISDN"). (MAP: Send-Routing Information; MSISDN; GSMC→HLR).

H. Short Message

A short message that is to be allocated to a mobile subscriber, the Short Message Service Center ("SMCS") must query the HLR for the location of the called party. Using the MSISDN, the NAR relays the message (Send-Routing-Information-For-SM) to the appropriate HLR. If the target subscriber cannot be reached, for example when the mobile telephone is turned off, the SMSC can request the HLR to inform the SMSC when the subscriber becomes available, so that the SMSC can relay the short message again. (MAP: Send-Routing-Information-For-SM; MSISDN; SMSC→HLR) (MAP: Set-Message-Waiting Data; MSISDN; SMSC→HLR).

I. Value-Added Services

The value-added services from the VLR toward the HLR do not require any additional functions in the NAR. The messages are routed by the VLR to the corresponding HLR based on the stored network address.

Some value-added services of network elements other than the VLR may require that the NAR relay the supplementary service operation to the appropriate HLR when the HLR network address for a subscriber is not known by the other network elements. A VMSC may also initiate supplementary services.

A subscriber can use value-added services, such as a Voice Mail Service Center ("VMSC"). A MAP interface between a VMSC and a HLR may be required for the subscriber to use the VMSC. Since the VMSC does not know the network address of the HLR for the subscriber who is handling its value-added service, the NAR relays the MAP message to the HLR based on the IMSI. Other value-add services, such as Interactive Voice Response ("IVR"), may also use the NAR to relay the MAP message to the HLR based on the IMSI.

J. Authentication Center ("AuC")

In a mobile telephony network, the function of the AuC can also be integrated into each HLR for the subscriber data records stored in this HLR. The VLR may query the AuC for the authentication information. If the network address of the HLR is not known in the VLR when the subscriber is initiated into the network, the NAR must relay the MAP messages for authentication to the HLR/AuC based on the IMSI. (MAPv1: Send-Parameters; IMSI; VLR→HLR/AuC). (MAPv2: Send-Authentication-Info; IMSI; VLR→HLR/AuC).

K. SIM Card Handling

When a SIM card of a subscriber needs to be replaced, for example when a SIM card is defective or when new services are introduced, the subscriber may wish to retain the same calling number. A SIM card may need to be replaced, for example, when a SIM card is defective or when new services are introduced. Thus, when a SIM card is replaced, the MSISDN remains the same and a new IMSI is assigned to the subscriber. Replacement of a large number of SIM cards occurs regularly. Because the NAR allows flexible allocation of MSISDNs and IMSIs to subscribers and HLRs, the administrative costs of SIM card replacement is greatly reduced. When a new service is introduced, new SIM cards may be required for a large number of subscribers.

L. International Roaming

Call control of international roaming calls may not generate any special requirements for the NAR.

M. Data Security and Privacy

No subscriber data, such as supplementary services or call forwarding destinations, are stored on the NAR. The HLR may maintain the subscriber profile as in conventional systems. Only routing data is stored in the NAR. The routing data describes the network element in which the subscriber data are located. The NAR, therefore does not create any special data security or privacy concerns.

N. Intelligent Network ("IN")

The subscriber data is stored in the HLR for GSM services. Similarly, the subscriber data for a subscriber's IN services are stored in the Service Control Point ("SCP"). If the network contains multiple SCPs, the NAR also determines the appropriate SCP on which the subscriber's data is stored.

The two main types of services, subscriber-specific services and network-wide services, may be handled differently. Subscriber-specific services may require that the associated subscriber data be available before the IN service is provided. The subscriber-specific data may be stored on the SCP. Thus, the NAR determines the SCP associated with the subscriber and hands over service control to that SCP. INAP: InitialDP, service key, calling party number ("MSISDN"), IMSI, and IMEI for originating services. INAP: InitialDP, service key, called party number ("MSISDN"), IMSI, and IMEI for terminating services such as terminating call screening.

While network-wide services normally do not use subscriber-specific data, the SCP on which the service logics are implemented must be determined before network-wide services can be provided. The routing criterion for selecting the appropriate SCP is based on a service key and not the subscriber's calling number. INAP: InitialDP and service key.

O. Local Number Portability ("LNP")

When a customer in the fixed network changes his telecommunications carrier, the customer may wish to retain the same calling number (telephone number). The destination network of the called party can be determined during the call set-up phase by the source network (on-call inquiry). A database in which the ported subscribers are registered is queried in the source network. Due to the expected high dynamic load generated by the database queries, the database preferably is a high speed database. The NAR may include the LNP database.

P. Mobile Number Portability ("MNP")

The European Telecommunications Standards Institute ("ETSI") is working to standardize MNP. The options includes a MAP protocol and an INAP protocol. The NAR may be configured to conform either protocol in terms of call control, mobility management, and supplementary service handling (e.g. for CCBS). The NAR may also be configured to conform other protocols.

Q. Optimized Voice Mail Routing

For capacity reasons, numerous Voice Mail Service Centers ("VMSC") may be used in the mobile telephone network. In conventional systems, subscribers are allocated to a VMSC based on the customer's calling number. A more economical allocation method is to allocate a subscriber to the VMSC based on the subscriber's most frequent location. That is, the VMSC allocation is based on subscriber-specific information rather than a block-wise allocation. The NAR determines the appropriate VMSC similar to how the NAR determines the appropriate the HLR.

R. Equipment Identity Register ("EIR")

Optionally, the NAR may use the IMEI to determine the appropriate EIR for an inquiry. Under the current standards, only the address of an EIR can be entered in the MSC and routing can not be apportioned by IMEI blocks. This means that each IMEI must store each EIR. This creates data consistency concerns. In an improved system, routing to the EIR may be apportioned regionally. With a single NAR in the telephone network, routing could be implemented using the IMEI and potential data inconsistency can be ruled out. MAP: Check-IMEI and IMEI.

S. Subscriber Administration

As an expansion of the functionality of the NAR, an ABC may respond like an HLR. All activations and changes are sent to the NAR. The NAR then determines the appropriate HLR and relays the message to that HLR.

By introducing the NAR in the areas described above, many tasks can be solved more efficiently resulting in cost savings that outweigh the cost of the NAR. In addition to the cost savings, the capacity utilization of the network elements may be optimized. The optimization results in additional capacity and may eliminate the need for additional network elements.

As a person skilled in the art will recognize from the previous description and from the figures and claims, modifications and changes can be made to the preferred embodiments of the invention without departing from the scope of the invention defined in the following claims.

What is claimed is:

1. A network address register for use in a telephone switching network to route messages, comprising:
   a database comprising subscriber-specific data and network item addresses; and
   a network address register that receives from a first network item a network message, determines a network item address for the network message as a function of the subscriber-specific data in the message using the database, and transmits the network message to a network address of a second network item, wherein the network address register transmits the network address of the second network item to the first network item and establishes a traffic channel with the second network item, wherein the first network item comprises a mobile services switching center, the second network item comprises a voice mail service center, and the subscriber-specific data comprises an mobile station ISDN number, wherein the traffic channel comprises a voice channel to a voice mailbox, and wherein the network address register receives the mobile station ISDN number from the voice mail service center and determines a network address of the second network item as a function of the mobile station ISDN number, wherein the second network item comprises a home location register.

2. The network address register of claim 1, wherein the network address register is capable of being used in a Global System for Mobile Communications network.

3. The network address register of claim 2, wherein the subscriber-specific data further comprises one or more elements selected from the group consisting of: international mobile subscriber identity, and international mobile equipment identity.

4. The network address register of claim 2, wherein the second network item further comprises one or more elements selected from the group consisting of: an authentication center, equipment identity register, and service control point.

5. The network address register of claims 2, wherein the network address register returns routing information to a network item that sent the network message.

6. The network address register of claim 2, wherein the database comprises an association between the subscriber-specific data and network item addresses such that the network item addresses are independent of block numbering ranges.

7. The network address register of claim 6, wherein the association between the subscriber-specific data and network item addresses is configurable.

8. A method of routing messages in a Global System for Mobile Communications switching network, comprising:
   receiving a network message having subscriber-specific data at a network address register from a first network item;
   determining at the network address register a network address of a second network item as a function of the subscriber-specific data, wherein the second network item replies directly to the first network item; and
   transmitting the network message to the network address of a second network item, and further comprising:
   transmitting the network address of the second network item to the first network item;
   establishing a traffic channel with the second network item, wherein the first network item comprises a mobile services switching center, the second network item comprises a voice mail service center, and the subscriber-specific data comprises an mobile station ISDN number, wherein the traffic channel comprises a voice channel to a voice mailbox;
   transmitting the mobile station ISDN number from the voice mail service center to the network address register; and
   determining in the network address register a network address of the second network item as a function of the mobile station ISDN number, wherein the second network item comprises a home location register.

9. The method of claim 8, wherein the first network item comprises a mobile services switching center, and the subscriber-specific data comprises an international mobile subscriber identity.

10. The method of claim 9, wherein the subscriber-specific data further comprises a mobile station ISDN number.

11. The method of claim 8, further comprising:
    transmitting an international mobile equipment identity of a portable radio device from the mobile services switching center to the network address register; and
    determining in the network address register the address of the service control point as a function of the international mobile equipment identity.

12. The method of claim 11, further comprising:
    receiving an international mobile subscriber identity from the mobile services switching center at the network address register;
    determining in the network address register the address of the authentication center as a function of the international mobile subscriber identity; and
    providing authentication of the international mobile subscriber identity to the mobile services switching center.

* * * * *